UNITED STATES PATENT OFFICE.

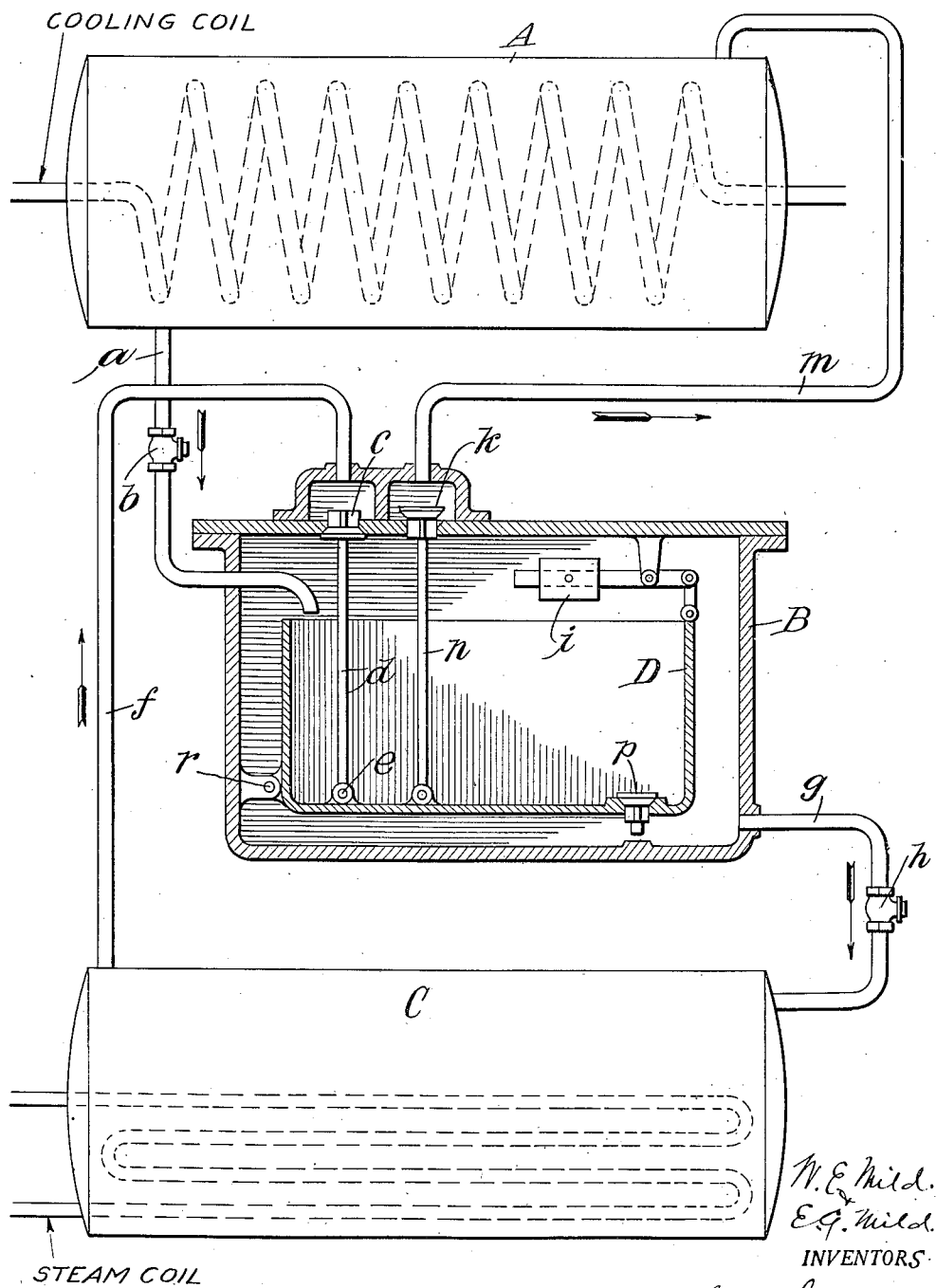

WILLIAM E. MILD AND EDWARD G. MILD, OF DAYTON, OHIO.

REFRIGERATING APPARATUS.

1,324,610.            Specification of Letters Patent.      Patented Dec. 9, 1919.

Application filed December 23, 1918. Serial No. 267,929.

*To all whom it may concern:*

Be it known that we, WILLIAM E. MILD and EDWARD G. MILD, citizens of the United States, residing at National Military Home, Dayton, in the county of Montgomery and State of Ohio, have invented certain new and useful Improvements in Refrigerating Apparatus, of which the following is a specification.

Our invention relates to improvements in refrigerating apparatus of the ammonia or like absorption type, of the class in which the ammonia or other medium of refrigeration does not complete the cycle of the apparatus. Hitherto with apparatus of this nature it has been usual to form a complete cycle with a pump, or the generator absorber type of apparatus. Arrangements of the pump type require attention, power to operate, and are hard to prevent stuffing box leakage, and the constant wear and tear on the pump is also an objection. With the arrangements of the absorber generator type, it has been found impossible to secure sufficient rapid absorption of the medium. It is therefore the principal object of the present invention to overcome these difficulties and to thus considerably increase the efficiency of the apparatus.

To these ends the present improvements comprise a system including an absorber, a generator, and a return trap of the bucket type for conducting the ammonia liquor from the absorber to the generator, the absorber being placed at a higher level than the generator and trap, a pipe with a check valve forming a communication from the absorber to the trap, and a pipe with a check valve forming a communication from the trap to the generator. Our invention comprises further details and arrangements of parts to be hereinafter more particularly referred to in connection with the accompanying drawing which is diagrammatic. The trap as it there appears is enlarged out of proportion to the absorber and generator. Parts of the entire refrigerating system are omitted from the illustration because of the fact that a complete illustration of the system is not necessary to an understanding of the present improvements.

In carrying our invention into effect in a convenient manner, for example, when applying it to an ammonia absorption apparatus, the absorber A is placed on a higher level than the bucket trap B so that the ammonia liquor flows by gravity into the trap through the pipe $a$ having a check valve $b$. When the dump vessel D of the trap becomes full it drops upon its hinge $r$ and mechanically opens an equalizing valve $c$ connected to valve rod $d$ pivoted at $e$ to the bottom of the said dump vessel D. The hinge or pivot $r$ affords the least possible friction or resistance to the movement of the bucket so that at no time is there danger of the bucket sticking or failing to act or move upon its pivot when required. The valve $c$ then opens the trap B to the pipe $f$ which communicates with the top of said trap from the generator C. This operation of the trap enables the pressure in the generator and trap to equalize. The said generator being on a lower level than the trap, the ammonia liquor flows by gravity through pipe $g$ having a check valve $h$ into the upper part of the generator. When the dump vessel D of the trap becomes empty, the counter-balance weight $i$ which is connected to the said dump vessel, elevates said vessel to its level position and closes the equalizing valve $c$ to the said generator. At such time the valve $p$ in the bottom of the dump vessel also closes. At this time the equalizing valve $k$ is opened and there is established a communication between the bucket trap B and the top of the absorber A through a pipe $m$ which operation relieves the gas pressure in the trap and said trap will refill again from the absorber A and discharge into the generator C. The equalizing valve $k$ has its rod $n$ connected to the bottom of the dump vessel D similar to rod $d$ of valve $c$. The ammonia liquor in absorber A flows into the trap B through the pipe $a$ by gravity. When the weight of the ammonia liquor in vessel D becomes sufficient to dump said vessel the trap drain valve $p$ in the bottom of the trap opens and the ammonia liquor flows into the generator C through the pipe $g$ and through check valve $h$. When the counter-balance weight $i$ returns the dump vessel D of the trap to its level position the equalizing valve $c$ closes the trap to the generator and opens it to the absorber, the equalizing valve $k$ relieving the ammonia gas pressure through pipe $m$ from the trap to the top of the said absorber. As appears in the diagram hereto annexed this is the condition of the apparatus as there shown. When the trap is again filled from the absorber A the cycle is repeated.

Having described our invention, we claim:

In a refrigerating apparatus of the type specified, an absorber, a generator, a trap consisting of a tight casing, a bucket hinged at one side and supported at the other by a weight, equalizing valves in the top of said casing, pipes forming connections between casing and the absorber and generator respectively, and a drain valve in the bottom of said bucket, substantially as specified.

In testimony whereof we affix our signatures.

WILLIAM E. MILD.
EDWARD G. MILD.